United States Patent
Johnson et al.

(10) Patent No.: US 6,426,152 B1
(45) Date of Patent: Jul. 30, 2002

(54) SALVAGED CASTINGS AND METHODS OF SALVAGING CASTINGS WITH DEFECTIVE CAST COOLING BUMPS

(75) Inventors: Robert Alan Johnson, Simpsonville; Jon Conrad Schaeffer, Greenville, both of SC (US); Ching-Pang Lee, Cincinnati, OH (US); Nesim Abuaf, Lincoln City, OR (US); Wayne Charles Hasz, Pownal, VT (US)

(73) Assignee: General Electric Company, Schenectady, NY (US)

( * ) Notice: Subject to any disclaimer, the term of this patent is extended or adjusted under 35 U.S.C. 154(b) by 40 days.

(21) Appl. No.: 09/737,089

(22) Filed: Dec. 14, 2000

(51) Int. Cl.$^7$ .......................... B22F 5/00; B21D 47/04; B23P 6/04; B32B 3/10
(52) U.S. Cl. .................. 428/553; 428/559; 428/573; 428/601; 427/142; 29/889.1; 29/897.1; 228/119
(58) Field of Search ................. 428/553, 559, 428/573, 601; 427/142; 29/889.1, 897.1; 228/119

(56) References Cited

U.S. PATENT DOCUMENTS

| | | | |
|---|---|---|---|
| 3,800,864 A | * | 4/1974 | Hauser et al. |
| 4,958,431 A | * | 9/1990 | Clark et al. |
| 5,353,865 A | | 10/1994 | Adiutori et al. |
| 5,577,555 A | * | 11/1996 | Hisajima et al. |
| 5,660,523 A | * | 8/1997 | Lee |
| 5,735,448 A | * | 4/1998 | Draghi et al. |
| 6,067,712 A | * | 5/2000 | Randlett et al. |
| 6,243,948 B1 | * | 6/2001 | Lee et al. |
| RE37,562 E | * | 2/2002 | Clark et al. |

OTHER PUBLICATIONS

"39$^{th}$ GE Turbine State–of–the–Art Technology Seminar", Tab 1, ""F" Technology—the First Half–Million Operating Hours", H.E. Miller, Aug. 1996.
"39th GE Turbine State–of–the–Art Technology Seminar", Tab 2, "GE Heavy–Duty Gas Turbine Performance Characteristics", F. J. Brooks, Aug. 1996.
"39th GE Turbine State–of–the–Art Technology Seminar", Tab 3, "9EC 50Hz 170–MW Class Gas Turbine", A. S. Arrao, Aug. 1996.
"39th GE Turbine State–of–the–Art Technology Seminar", Tab 4, "MWS6001FA—An Advanced–Technology 70–MW Class 50/60 Hz Gas Turbine", Ramachandran et al., Aug. 1996.
"39th GE Turbine State–of–the–Art Technology Seminar", Tab 5, "Turbomachinery Technology Advances at Nuovo Pignone", Benvenuti et al., Aug. 1996.
"39th GE Turbine State–of–the–Art Technology Seminar", Tab 6, "GE Aeroderivative Gas Turbines—Design and Operating Features", M.W. Horner, Aug. 1996.
"39th GE Turbine State–of–the–Art Technology Seminar", Tab 7, "Advance GAS Turbine Materials and Coatings", P.W. Schlike, Aug. 1996.

(List continued on next page.)

Primary Examiner—Deborah Jones
Assistant Examiner—Jason Savage
(74) Attorney, Agent, or Firm—Nixon & Vanderhye

(57) ABSTRACT

Castings for gas turbine parts exposed on one side to a high-temperature fluid medium have cast-in bumps on an opposite cooling surface side to enhance heat transfer. Areas on the cooling surface having defectively cast bumps, i.e., missing or partially formed bumps during casting, are coated with a braze alloy and cooling enhancement material to salvage the part.

13 Claims, 3 Drawing Sheets

OTHER PUBLICATIONS

"39th GE Turbine State–of–the–Art Technology Seminar", Tab 8, "Dry Low $NO_X$ Combustion Systems for GE Heavy–Duty Turbines", L. B. Davis, Aug. 1996.

"39th GE Turbine State–of–the–Art Technology Seminar", Tab 9, "GE Gas Turbine Combustion Flexibility", M. A. Davi, Aug. 1996.

"39th GE Turbine State–of–the–Art Technology Seminar", Tab 10, "Gas Fuel Clean–Up System Design Considerations for GE Heavy–Duty Gas Turbines", C. Wilkes, Aug. 1996.

"39th GE Turbine State–of–the–Art Technology Seminar", Tab 11, "Integrated Control Systems for Advanced Combined Cycles", Chu et al., Aug. 1996.

"39th GE Turbine State–of–the–Art Technology Seminar", Tab 12, "Power Systems for the 21st Century "H" Gas Turbine Combined Cycles", Paul et al., Aug. 1996.

"39th GE Turbine State–of–the–Art Technology Seminar", Tab 13, "Clean Coal and Heavy Oil Technologies for Gas Turbines", D. M. Todd, Aug. 1996.

"39th GE Turbine State–of–the–Art Technology Seminar", Tab 14, "Gas Turbine Conversions, Modifications and Uprates Technology", Stuck et al., Aug. 1996.

"39th GE Turbine State–of–the–Art Technology Seminar", Tab 15, "Performance and Reliability Improvements for Heavy–Duty Gas Turbines,"J. R. Johnston, Aug. 1996.

"39th GE Turbine State–of–the–Art Technology Seminar", Tab 16, "Gas Turbine Repair Technology", Crimi et al, Aug. 1996.

"39th GE Turbine State–of–the–Art Technology Seminar", Tab 17, "Heavy Duty Turbine Operating & Maintenance Considerations", R. F. Hoeft, Aug. 1996.

"39th GE Turbine State–of–the–Art Technology Seminar", Tab 18, "Gas Turbine Performance Monitoring and Testing", Schmitt et al., Aug. 1996.

"39th GE Turbine State–of–the–Art Technology Seminar", Tab 19, "Monitoring Service Delivery System and Diagnostics", Madej et al., Aug. 1996.

"39th GE Turbine State–of–the–Art Technology Seminar", Tab 20, "Steam Turbines for Large Power Applications", Reinker et al., Aug. 1996.

"39th GE Turbine State–of–the–Art Technology Seminar", Tab 21, "Steam Turbines for Ultrasupercritical Power Plants", Retzlaff et al., Aug. 1996.

"39th GE Turbine State–of–the–Art Technology Seminar", Tab 22, "Steam Turbine Sustained Efficiency", P. Schofield, Aug. 1996.

"39th GE Turbine State–of–the–Art Technology Seminar", Tab 23, "Recent Advances in Steam Turbines for Industrial and Cogeneration Applications", Leger et al., Aug. 1996.

"39th GE Turbine State–of–the–Art Technology Seminar", Tab 24, "Mechanical Drive Steam Turbines", D. R. Leger, Aug. 1996.

"39th GE Turbine State–of–the–Art Technology Seminar", Tab 25, "Steam Turbines for STAG™ Combined–Cycle Power Systems", M. Boss, Aug. 1996.

"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.

"39th GE Turbine State–of–the–Art Technology Seminar", Tab 28, "High–Power–Density™ Steam Turbine Design Evolution", J. H. Moore, Aug. 1996.

"39th GE Turbine State–of–the–Art Technology Seminar", Tab 29, "Advances in Steam Path Technologies", Cofer, IV, et al., Aug. 1996.

"39th GE Turbine State–of–the–Art Technology Seminar", Tab 30, "Upgradable Opportunities for Steam Turbines", D. R. Dreier, Jr., Aug. 1996.

"39th GE Turbine State–of–the–Art Technology Seminar", Tab 31, "Uprate Options for Industrial Turbines", R. C. Beck, Aug. 1996.

"39th GE Turbine State–of–the–Art Technology Seminar", Tab 32, "Thermal Performance Evaluation and Assessment of Steam Turbine Units", P. Albert, Aug. 1996.

"39th GE Turbine State–of–the–Art Technology Seminar", Tab 33, "Advances in Welding Repair Technology", J. F. Nolan, Aug. 1996.

"39th GE Turbine State–of–the–Art Technology Seminar", Tab 34, "Operation and Maintenance Strategies to Enhance Plant Profitability", MacGillivray et al., Aug. 1996.

"39th GE Turbine State–of–the–Art Technology Seminar", Tab 35, "Generator Insitu Inspections", D. Stanton.

"39th GE Turbine State–of–the–Art Technology Seminar", Tab 36, "Generator Upgrade and Rewind", Halpern et al., Aug. 1996.

"39th GE Turbine State–of–the–Art Technology Seminar", Tab 37, "GE Combined Cycle Product Line and Performance", Chase, et al., Aug. 1996.

"39th GE Turbine State–of–the–Art Technology Seminar", Tab 38, "GE Combined Cycle Experience", Maslak et al., Aug. 1996.

"39th GE Turbine State–of–the–Art Technology Seminar", Tab 39, "Single–Shaft Combined Cycle Power Generation Systems", Tomlinson et al., Aug. 1996.

"Advanced Turbine System Program—Conceptual Design and Product Development", Annual Report, Sep. 1, 1994–Aug. 31, 1995.

"Advanced Turbine Systems (ATS Program) Conceptual Design and Product Development", Final Technical Progress Report, vol. 2—Industrial Machine, Mar. 31, 1997, Morgantown, WV.

"Advanced Turbine Systems (ATS Program), Conceptual Design and Product Development", Final Technical Progress Report, Aug. 31, 1996, Morgantown, WV.

"Advanced Turbine Systems (ATS) Program, Phase 2, Conceptual Design and Product Development", Yearly Technical Progress Report, Reporting Period: Aug. 25, 1993–Aug. 31, 1994.

"Advanced Turbine Systems" Annual Program Review, Preprints, Nov. 2–4, 1998, Washington, D.C. U.S. Department of Energy, Office of Industrial Technologies Federal Energy Technology Center.

"ATS Conference" Oct. 28, 1999, Slide Presentation.

"Baglan Bay Launch Site", various articles relating to Baglan Energy Park.

"Baglan Energy Park", Brochure.

"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176–11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology, GE Introduces Advanced Gas Turbine Technology Platform: First to Reach 60% Combined–Cycle Power Plant Efficiency", Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the 21$^{st}$ Century—"H" Gas Turbine Combined Cycles", Thomas C. Paul et al., Report,.

"Power–Gen '96 Europe", Conference Porgramme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, pp. 3–13, Oct., 1995.

"Proceedings of the Advanced Turbine Systems Annual Program Review Meeting", vol. I, "H Gas Turbine Combined Cycle", J. Corman, pp. 14–21, Oct., 1995.

"Proceedings of the Advanced Turbine Systems Annual Program Review Meeting", vol. I, "Overview of Westinghouse's Advanced Turbine Systems Program", Bannister et al., pp. 22–30, Oct., 1995.

"Proceedings of the Advanced Turbine Systems Annual Program Review Meeting", vol. I, "Allison Engine ATS Program Technical Review", D. Mukavetz, pp. 31–42, Oct., 1995.

"Proceedings of the Advanced Turbine Systems Annual Program Review Meeting", vol. I, "Advanced Turbine Systems Program Industrial System Concept Development", S. Gates, pp. 43–63, Oct., 1995.

"Proceedings of the Advanced Turbine Systems Annual Program Review Meeting", vol. I, "Advanced Turbine Systems Program Phase 2 Cycle Selection", Latcovich, Jr., pp. 64–69, Oct., 1995.

"Proceedings of the Advanced Turbine Systems Annual Program Review Meeting", vol. I, "General Electric ATS Program Technical Review Phase 2 Activities", Chance et al., pp. 70–74, Oct., 1995.

"Proceedings of the Advanced Turbine Systems Annual Program Review Meeting", vol. I, "Technical Review of Westinghouse's Advanced Turbine Systems Program", Diakunchak et al., pp. 75–86, Oct., 1995.

"Proceedings of the Advanced Turbine Systems Annual Program Review Meeting", vol. I, "Advanced Combustion Turbines and Cycles: An EPRI Perspective", Touchton et al., pp. 87–88, Oct., 1995.

"Proceedings of the Advanced Turbine Systems Annual Program Review Meeting", vol. I, "Advanced Turbine Systems Annual Program Review", William E. Koop, pp. 89–92, Oct., 1995.

"Proceedings of the Advanced Turbine Systems Annual Program Review Meeting", vol. I, "The AGTSR Consortium: An Update", Fant et al., pp. 93–102, Oct., 1995.

"Proceedings of the Advanced Turbine Systems Annual Program Review Meeting", vol. I, "Overview of Allison/AGTSR Interactions", Sy A. Ali, pp. 103–106, Oct., 1995.

"Proceedings of the Advanced Turbine Systems Annual Program Review Meeting", vol. I, "Design Factors for Stable Lean Premix Combustion", Richards et al., pp. 107–113, Oct., 1995.

"Proceedings of the Advanced Turbine Systems Annual Program Review Meeting", vol. I, "Ceramic Stationary as Turbine", M. van Roode, pp. 114–147, Oct., 1995.

"Proceedings of the Advanced Turbine Systems Annual Program Review Meeting", vol. I, "DOE/Allison Ceramic Vane Effort", Wenglarz et al., pp. 148–151, Oct., 1995.

"Proceedings of the Advanced Turbine Systems Annual Program Review Meeting", vol. I, "Materials/Manufacturing Element of the Advanced Turbine Systems Program", Karnitz et al., pp. 152–160, Oct., 1995.

"Proceedings of the Advanced Turbine Systems Annual Program Review Meeting", vol. I, "Land–Based Turbine Casting Initiative", Mueller et al., pp. 161–170, Oct., 1995.

"Proceedings of the Advanced Turbine Systems Annual Program Review Meeting", vol. I, "Turbine Airfoil Manufacturing Technology", Kortovich, pp. 171–181, Oct., 1995.

"Proceedings of the Advanced Turbine Systems Annual Program Review Meeting", vol. I, "Pratt & Whitney Thermal Barrier Coatings", Bornstein et al., pp. 182–193, Oct., 1995.

"Proceedings of the Advanced Turbine Systems Annual Program Review Meeting", vol. I, "Westinhouse Thermal Barrier Coatings", Goedjen et al., pp. 194–199, Oct., 1995.

"Proceedings of the Advanced Turbine Systems Annual Program Review Meeting", vol. I, "High Performance Steam Development", Duffy et al., pp. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., pp. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. pp. 233–248, Oct., 1995.

"Proceedings of the Advanced Turbine Systems Annual Program Review Meeting", vol. II, "Lean Premixed Flames for Low $No_X$ Combustors", Sojka et al., pp. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., pp. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., pp. 281–309, Oct., 1995.

"Proceedings of the Advanced Turbine Systems Annual Program Review Meeting", vol. II, "Life Prediction of Advanced Materials for Gas Turbine Application", Zamrik et al., pp. 310–327, Oct., 1995.

"Proceedings of the Advanced Turbine Systems Annual Program Review Meeting", vol. II, "Advanced Combustion Technologies for Gas Turbine Power Plants", Vandsburger et al., pp. 328–352, Oct., 1995.

"Proceedings of the Advanced Turbine Systems Annual Program Review Meeting", vol. II, "Combustion Modeling in Advanced Gas Turbine Systems", Smoot et al., pp. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. pp. 371–390, Oct., 1995.

"Proceedings of the Advanced Turbine Systems Annual Program Review Meeting", vol. II, "Rotational Effects of Turbine Blade Cooling", Govatzidakia et al., pp. 391–392, Oct., 1995.

"Proceedings of the Advanced Turbine Systems Annual Program Review Meeting", vol. II, "Manifold Methods for Methane Combustion", Yang et al., pp. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., pp. 410–414, Oct., 1995.

"Proceedings of the Advanced Turbine Systems Annual Program Review Meeting", vol. II, The Role of Reactant Unmixedness, Strain Rate, and Length Scale on Premixed Combustor Performance, Samuelsen et al., pp. 415–422, Oct., 1995.

"Proceedings of the Advanced Turbine Systems Annual Program Review Meeting", vol. II, "Experimental and Computational Studies of Film Cooling With Compound Angle Injection", Goldstein et al., pp. 423–451, Oct., 1995.

"Proceedings of the Advanced Turbine Systems Annual Program Review Meeting", vol. II, "Compatibility of Gas Turbine Materials with Steam Cooling", Desai et al., pp. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, pp. 465–473, Oct., 1995.

"Proceedings of the Advanced Turbine Systems Annual Program Review Meeting", vol. II, Effects of Geometry on Slot–Jet Film Cooling Performance, Hyams et al., pp. 474–496 Oct., 1995.

"Proceedings of the Advanced Turbine Systems Annual Program Review Meeting", vol. II, "Steam as Turbine Blade Coolant: Experimental Data Generation", Wilmsen et al., pp. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., pp. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., pp. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., pp. 529–538, Oct., 1995.

"Proceedings of the Advanced Turbine Systems Annual Program Review Meeting", vol. II, "Bond Strength and Stress Measurements in Thermal Barrier Coatings", Gell et al., pp. 539–549, Oct., 1995.

"Proceedings of the Advanced Turbine Systems Annual Program Review Meeting", vol. II, "Active Control of Combustion Instabilities in Low $NO_X$ Gas Turbines", Zinn et al., pp. 550–551, Oct., 1995.

"Proceedings of the Advanced Turbine Systems Annual Program Review Meeting", vol. II, "Combustion Instability Modeling and Analysis", Santoro et al., pp. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., pp. 560–565, Oct., 1995.

"Proceedings of the Advanced Turbine Systems Annual Program Review Meeting", vol. II, "Heat Pipe Turbine Vane Cooling", Langston et al., pp. 566–572, Oct., 1995.

"Proceedings of the Advanced Turbine Systems Annual Program Review Meeting", vol. II, "Improved Modeling Techniques for Turbomachinery Flow Fields", Lakshminarayana et al., pp. 573–581, Oct., 1995.

"Proceedings of the Advanced Turbine Systems Annual Program Review Meeting", vol. II, "Advanced 3D Inverse Method for Designing Turbomachine Blades", T. Dang, pp. 582, Oct., 1995.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Gas Turbine Association Agenda", William H. Day, pp. 3–16, Nov., 1996.

"Proceedings of the Advanced Turbine Systems Annual Program Review Meeting", "Power Needs in the Chemical Industry", Keith Davidson, pp. 17–26, Nov., 1996.

"Proceedings of the Advanced Turbine Systems Annual Program Review Meeting", "Advanced Turbine Systems Program Overview", David Esbeck, pp. 27–34, Nov., 1996.

"Proceedings of the Advanced Turbine Systems Annual Program Review Meeting", "Westinghouse's Advanced Turbine Systems Program", Gerard McQuiggan, pp. 35–48, Nov., 1996.

"Proceedings of the Advanced Turbine Systems Annual Program Review Meeting", "Overview of GE's H Gas Turbine Combined Cycle", Cook et al., pp. 49–72, Nov., 1996.

"Proceedings of the Advanced Turbine Systems Annual Program Review Meeting", "Allison Advanced Simple Cycle Gas Turbine System", William D. Weisbrod, pp. 73–94, Nov., 1996.

"Proceedings of the Advanced Turbine Systems Annual Program Review Meeting", "The AGTSR Industry—University Consortium", Lawrence P. Golan, pp. 95–110, Nov., 1996.

"Proceedings of the Advanced Turbine Systems Annual Program Review Meeting", "$NO_X$ and CO Emissions Models for Gas–Fired Lean–Premixed Combustion Turbines", A. Mellor, pp. 111–122, Nov., 1996.

"Proceedings of the Advanced Turbine Systems Annual Program Review Meeting", "Methodologies for Active Mixing and Combustion Control", Uri Vandsburger, pp. 123–156, Nov., 1996.

"Proceedings of the Advanced Turbine Systems Annual Program Review Meeting", "Combustion Modeling in Advanced Gas Turbine Systems", Paul O. Hedman, pp. 157–180, Nov., 19967.

"Proceedings of the Advanced Turbine Systems Annual Program Review Meeting", "Manifold Methods for Methane Combustion", Stephen B. Pope, pp. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, pp. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, pp. 211–232, Nov., 1996.

"Proceedings of the Advanced Turbine Systems Annual Program Review Meeting", "Combustion Instability Studies Application to Land–Based Gas Turbine Combustors", Robert J. Santoro, pp. 233–252.

"Proceedings of the Advanced Turbine Systems Annual Program Review Meeting", Active Control of Combustion Instabilities in Low $NO_X$ Turbines, Ben T. Zinn, pp. 253–264, Nov., 1996.

"Proceedings of the Advanced Turbine Systems Annual Program Review Meeting", "Life Prediction of Advanced Materials for Gas Turbine Application," Sam Y. Zamrik, pp. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, pp. 275–290, Nov., 1996.

"Proceedings of the Advanced Turbine Systems Annual Program Review Meeting", "Compatibility of Gas Turbine Materials with Steam Cooling", Vimal Desai, pp. 291–314, Nov., 1996.

"Proceedings of the Advanced Turbine Systems Annual Program Review Meeting", "Bond Strength and Stress Measurements in Thermal Barrier Coatings", Maurice Gell, pp. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, pp. 335–356, Nov., 1996.

"Proceedings of the Advanced Turbine Systems Annual Program Review Meeting", "Flow Characteristics of an Intercooler System for Power Generating Gas Turbines", Ajay K. Agrawal, pp. 357–370, Nov., 1996.

"Proceedings of the Advanced Turbine Systems Annual Program Review Meeting", "Improved Modeling Techniques for Turbomachinery Flow Fields", B. Lakshiminarayana, pp. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, pp. 393–406, Nov., 1996.

"Proceedings of the Advanced Turbine Systems Annual Program Review Meeting", "Advanced Turbine Cooling, Heat Transfer, and Aerodynamic Studies", Je–Chin Han, pp. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, pp. 427–446.

"Proceedings of the Advanced Turbine Systems Annual Program Review Meeting", "Experimental and Computational Studies of Film Cooling with Compound Angle Injection", R. Goldstein, pp. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, pp. 461–470, Nov., 1996.

"Proceedings of the Advanced Turbine Systems Annual Program Review Meeting", "Steam as a Turbine Blade Coolant: External Side Heat Transfer", Abraham Engeda, pp. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, pp. 483–498, Nov., 1996.

"Proceedings of the Advanced Turbine Systems Annual Program Review Meeting", "Closed–Loop Mist/Steam Cooling for Advanced Turbine Systems", Ting Wang, pp. 499–512, Nov., 1996.

"Proceedings of the Advanced Turbine Systems Annual Program Review Meeting", "Heat Pipe Turbine Vane Cooling", Langston et al., pp. 513–534, Nov., 1996.

"Proceedings of the Advanced Turbine Systems Annual Program Review Meeting", "EPRI's Combustion Turbine Program: Status and Future Directions", Arthur Cohn, pp. 535,–552 Nov., 1996.

"Proceedings of the Advanced Turbine Systems Annual Program Review Meeting", "ATS Materials Support", Michael Karnitz, pp. 553–576, Nov., 1996.

"Proceedings of the Advanced Turbine Systems Annual Program Review Meeting", "Land Based Turbine Casting Initiative", Boyd A. Mueller, pp. 577–592, Nov., 1996.

"Proceedings of the Advanced Turbine Systems Annual Program Review Meeting", "Turbine Airfoil Manufacturing Technology", Charles S. Kortovich, pp. 593–622, Nov., 1996.

"Proceedings of the Advanced Turbine Systems Annual Program Review Meeting", "Hot Corrosion Testing of TBS's", Norman Bornstein, pp. 623–631, Nov., 1996.

"Proceedings of the Advanced Turbine Systems Annual Program Review Meeting", "Ceramic Stationary Gas Turbine", Mark van Roode, pp. 633–658, Nov., 1996.

"Proceedings of the Advanced Turbine Systems Annual Program Review Meeting", "Western European Status of Ceramics for Gas Turbines", Tibor Bornemisza, pp. 659–670, Nov., 1996.

"Proceedings of the Advanced Turbine Systems Annual Program Review Meeting", "Status of Ceramic Gas Turbines in Russia", Mark van Roode, pp. 671, Nov., 1996.

"Status Report: The U.S. Department of Energy's Advanced Turbine systems Program", facsimile dated Nov. 7, 1996.

"Testing Program Results Validate GE's H Gas Turbine—High Efficiency, Low Cost of Electricity and Low Emissions", Roger Schonewald and Patrick Marolda, (no date available).

"Testing Program Results Validate GE's H Gas Turbine—High Efficiency, Low Cost of Electricity and Low Emissions", Slide Presentation—working draft, (no date available).

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Nos.: DOE/MC/31176–5628.

"Utility Advanced Turbine System (ATS) Technology Readiness Testing—Phase 3", Document #666274, Oct. 1, 1996–Sep. 30, 1997, Publication Date, Dec. 31, 1997, Report Nos.: DOE/MC/31176–10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Nos.: DOE/MC/31176–5340.

"Utility Advanced Turbine System (ATS) Technology Readiness Testing and Pre–Commercial Demonstration—Phase 3", Document #486132, Apr. 1–Jun. 30, 1976, Publication Date, Dec. 31, 1996, Report Nos.: DOE/MC/31176–5660.

"Utility Advanced Turbine System (ATS) Technology Readiness Testing and Pre–Commercial Demonstration—Phase 3", Document #587906, Jul. 1–Sep. 30, 1995, Publication Date, Dec. 31, 1995, Report Nos.: DOE/MC/31176–5339.

"Utility Advanced Turbine System (ATS) Technology Readiness Testing and Pre–Commercial Demonstration", Document #666277, Apr. 1–Jun. 30, 1997, Publication Date, Dec. 31, 1997, Report Nos.: DOE/MC/31176–8.

"Utility Advanced Turbine System (ATS) Technology Readiness Testing and Pre–Commercialization Demonstration" Jan. 1–Mar. 31, 1996, DOE/MC/31176–5338.

"Utility Advanced Turbine System (ATS) Technology Readiness Testing: Phase 3R", Document #756552, Apr. 1–Jun. 30, 1999, Publication Date, Sep. 1, 1999, Report Nos.: DE–FC21–95MC31176–23.

"Utility Advanced Turbine System (ATS) Technology Readiness Testing.", Document #656823, Jan. 1–Mar. 31, 1998, Publication Date, Aug. 1, 1998, Report Nos.: DOE/MC/31176–17.

"Utility Advanced Turbine Systems (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997–Sep. 30, 1998.

"Utility Advanced Turbine Systems (ATS) Technology Readiness Testing", Document #750405, Oct. 1–Dec. 30, 1998, Publication Date: May 1, 1999, Report Nos.: DE–FC21–95MC31176–20.

"Utility Advanced Turbine Systems (ATS) Technology Readiness Testing", Document #1348, Apr. 1–Jun. 29, 1998, Publication Date Oct. 29, 1998, Report Nos. DE–FC21–95MC31176–18.

"Utility Advanced Turbine Systems (ATS) Technology Readiness Testing–Phase 3", Annual Technical Progress Report, Reporting Period: Oct. 1, 1996–Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report Nos.: DOE/MC/31176–07.

"Proceedings of the 1997 Advanced Turbine Systems", Annual Program Review Meeting, Oct. 28–29, 1997.

* cited by examiner

SALVAGED CASTINGS AND METHODS OF SALVAGING CASTINGS WITH DEFECTIVE CAST COOLING BUMPS

This invention was made with Government support under Contract No. DE-FC21-95MC31176 awarded by the Department of Energy. The Government has certain rights in this invention.

BACKGROUND OF THE INVENTION

The present invention relates to a turbine casting having cast-in cooling bumps along a surface to provide improved heat transfer between a cooling medium and the opposite side of the casting. Particularly, the present invention relates to methods for salvaging castings with defective cast cooling bumps by applying a coating to areas of the defectively cast bumps to improve their heat transfer characteristics. The present invention also relates to the salvaged castings.

Various techniques have been devised to maintain the temperature of gas turbine components below critical levels. For example, a cooling medium such as coolant air from the turbine compressor or steam is often directed to the component along one or more component surfaces. Such flow is understood in the art as backside flow, where the cooling medium is directed at a surface of the component not directly exposed to high temperature gases of combustion. Enhanced heat transfer is also accomplished by providing cast cooling bumps along the backside flow surface. For example, cast cooling bumps may be provided in a gas turbine on the inside surfaces of the stage 1 and stage 2 nozzles. It will be appreciated that the outer surfaces of the nozzles are exposed to the hot gases and are subject to very high temperatures on the hot gas path exposed side thereof. A cooling medium such as steam or air flows through various cavities within the nozzles along the interior nozzle surfaces to provide backside cooling flow. The cast-in bumps on the interior surfaces of the nozzle have a generally hill-like shape and are spaced from one another to provide a coolant side surface area larger than that of the baseline smooth surface area.

In certain gas turbine components, for example, nozzles, the cast-in cooling bumps are sometimes defective. By defective cast bumps is meant that one or more bumps are missing from the surface of the cast part or the bump is only partially formed. These defects occur as a result of manufacturing process limitations. When the parts are cast and inspected, defective areas can be identified and the parts are sometimes scrapped. This results in a significant financial loss. Accordingly, there is a need to provide a method for salvaging cast parts of a turbine that have defective cast cooling bumps.

BRIEF SUMMARY OF THE INVENTION

In accordance with a preferred embodiment of the present invention, there is provided methods of salvaging a casting having cast cooling bumps projecting from a surface thereof wherein one or more areas of that surface have defectively cast bumps manifested by one or more missing or partially cast bumps. To accomplish the foregoing, the surface area or areas manifested by one or more missing or cast bumps are first identified by visual inspection or thermography. Once identified, the area or areas are cleaned and the defective bumps removed, e.g., by grinding or grit blasting. Thus, partially formed bumps may be ground down to the surface area between the bumps, or the smooth area or areas with partially formed bumps may simply be roughened. After cleaning, cooling enhancement material is applied to the surface area(s) manifesting defectively cast bumps and the spaces between the defectively cast bumps. Preferably, a coating containing particles, e.g., metal particles, is applied to the defective area. For example, a green braze tape coated with a metallic powder is set in intimate contact with the defective area and brazed thereto. The size of the metallic powder particles is selected to provide heat transfer enhancement on the local defective surface area. The alloy of the metallic powder particles is chosen to withstand the part operating conditions while providing a high thermal conductivity. The braze alloy must also withstand the part operating temperature while not diminishing other part properties, i.e., LCF. By applying the coating in the local area of the defectively cast bumps, the part can be salvaged and utilized, notwithstanding the lack of bumps or partial bump formation in one or more areas of the backside surface. It will be appreciated that this salvage or repair technique can be used on most or all of the gas turbine parts having cast bumps for enhancing heat transfer, such as shrouds, certain stator nozzles, buckets and the like.

In a preferred embodiment according to the present invention, there is provided a method of salvaging a casting having cast cooling bumps projecting from a surface thereof wherein at least one area of the surface has defectively cast bumps manifested by one or more missing or partially cast bumps, comprising the steps of identifying the defectively cast area and applying a coating on the defectively cast area to form an overlying coated surface forming a coated surface area in excess of the uncoated defective surface area to afford enhanced heat transfer across the casting relative to the heat transfer across the casting without applying the coating.

In a further preferred embodiment according to the present invention, there is provided a method of salvaging a casting having cast cooling bumps projecting from a surface thereof wherein at least one area of the surface has defectively cast bumps manifested by one or more missing or partially cast bumps, comprising the steps of identifying the defectively cast area, providing a brazing sheet having cooling enhancement material and fusing the brazing sheet to the defectively cast area such that the cooling enhancement material is bonded thereto.

In a still further preferred embodiment according to the present invention, there is provided a cast body having a cooling surface and an opposite surface for exposure to a high-temperature fluid medium, the cooling surface having a plurality of cast cooling bumps projecting therefrom and at least one area thereof having defectively cast bumps manifested by one or more missing or partially cast bumps, a coating overlying the defectively cast area forming a coated surface having an area in excess of the defectively cast area to afford enhanced heat transfer across the casting relative to the heat transfer across the coating without the coating.

DETAILED DESCRIPTION OF THE INVENTION

Figure 1:
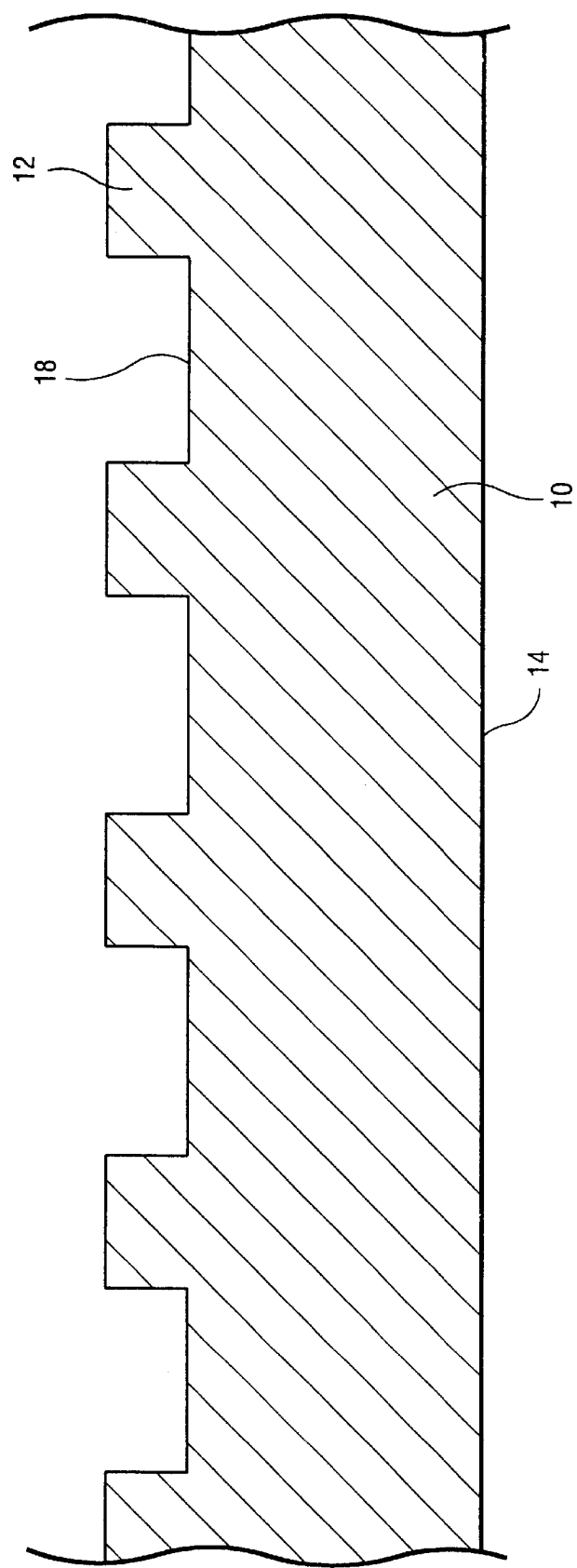
FIG. 1 is a fragmentary cross-sectional view of a casting having cooling enhancement bumps along a surface thereof.

Referring to FIG. 1, there is illustrated a metal casting 10 having a plurality of bumps 12 raised along one side of the casting 10. As an illustrative example, the casting 10 may comprise the wall of a nozzle, bucket or a shroud for a gas turbine. It will be appreciated that in both cases one surface 14 of the casting 10 is exposed to a high-temperature fluid such as hot gases of combustion flowing through a hot gas path. The opposite side contains a series of cast-in, generally hill-like or shaped cooling bumps arrayed along the cooling surface side of the casting to afford enhanced heat transfer. It will be appreciated that the bumps can be formed in many configurations such as semi-spheres, short pins, cylindrical or rectilinear and that the term "bumps" as used herein is not limited to any particular configuration, provided the bumps afford an increased surface area to enhance heat transfer across the casting.

Figure 2:
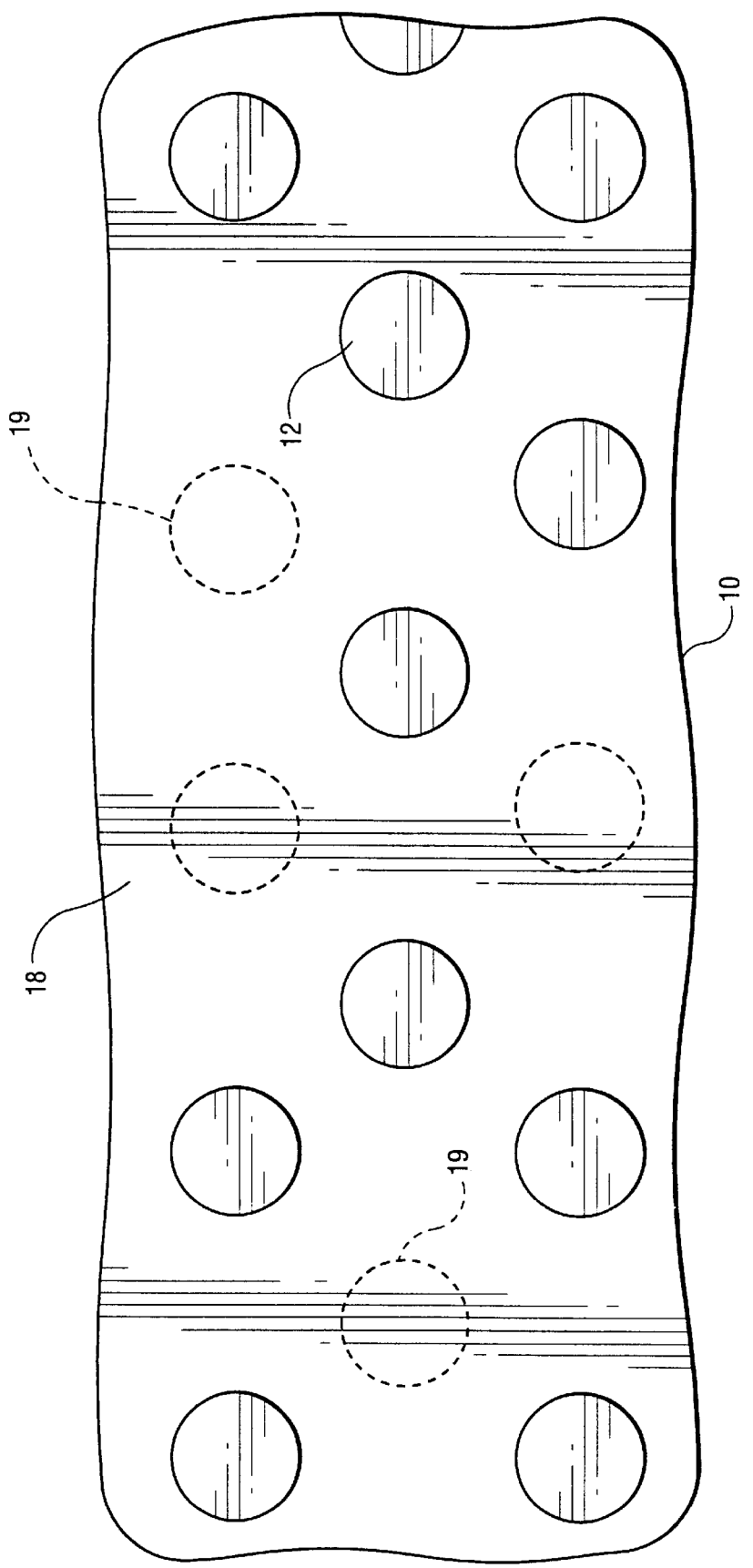
FIG. 2 is a plan view of the surface illustrating an area of defectively cast bumps.

As sometimes occurs, the bumps 12 are defective. That is, the bumps in certain areas along the cooling side surface 18 of the casting 10 are missing or only partially formed during the casting process. For example, as illustrated in FIG. 2, the cooling side surface 18 has a plurality of bumps 12 which are intended to be arranged in a patterned array of rows and columns. From a review of FIG. 2, however, it will be appreciated that certain bumps, e.g., bumps 19, are only partially formed or are missing from the rows of regularly spaced bumps 12. The partially cast bumps may extend only partly to their full height or have irregular configurations, or both. When significant areas of the casting are found to be defectively formed during the casting process, the parts are typically scrapped. In accordance with the present invention, the defectively cast parts are salvaged by applying a coating of heat transfer enhancement material to the defective areas to improve the local heat transfer.

To accomplish the foregoing, the defective area or areas of the casting are first identified. This can be done visually, by FPI inspection, thermography or even X-ray. Once identified, the defective area is cleaned, removing some or all of the defective bumps. For example, grinders or grit blasting may be applied to the defective areas, depending upon their accessibility. In nozzles, the openings to the nozzles are sufficiently large to insert a grinding head and thus remove poorly cast bumps or roughen the surface of the area which is defectively clear of bumps. Alternatively, the defectively formed bumps may remain in the defective area after cleaning. Subsequent to cleaning the defective areas, braze microturbulators are added to the defective locations and brazed on top of those areas or on top of the defective bumps and between the bumps. The application of these microturbulators significantly enhances the heat transfer of the local surface area and, for salvaging parts, they are applied only to the defective area or areas.

According to embodiments of the present invention, a layer of material containing at least a braze alloy component and a cooling enhancement material is utilized to provide cooling enhancement locally on the defective surface of the casting. As used herein, the term "layer" of material is used to denote a single layer or several discrete sub-layers that are sandwiched together. A "layer" of material may have several phases, including a matrix phase having a discrete phase dispersed therein, and several phases defined by sub-layers. The layer of material may be in the form of a free-standing sheet containing at least the cooling enhancement material and the braze alloy component. As used herein, "cooling enhancement material" is a material that, upon fusing to a substrate, forms a plurality of protuberances that extend beyond the surface of the substrate. These plurality of protuberances together define a "surface area enhancement," which appears as a roughened surface that is effective to increase heat transfer to the treated substrate. According to several embodiments of the present invention, the cooling enhancement material comprises a particulate phase comprised of discrete particles bonded to the substrate in the defective areas thereof. The particulate phase of discrete particles may be formed from a coarse powder, described in more detail below with respect to embodiments herein. While not intended to be bound by any theory of operation, it is believed that the cooling enhancement of the defective areas is a function of the increased surface area with the cooling enhancement material applied to the defective area (s) of the cast-in bumps as well as turbulation caused by the bumps and applied cooling enhancement material.

In one embodiment of the invention, the layer of material is a brazing patch or sheet, particularly a green braze tape. Such tapes are commercially available. In an embodiment, the green braze tape is formed from a slurry of metal powder and binder in a liquid medium such as water or an organic liquid. The liquid medium may function as a solvent for the binder. The metal powder is often referred to as the "braze alloy." In a second embodiment, a braze foil is used, i.e., a thin sheet of braze alloy with no binder.

The composition of the braze alloy is preferably similar to that of the cast part or substrate. For example, if the substrate is a nickel-based superalloy, the braze alloy can contain a similar nickel-based superalloy composition. In the alternative, nickel-based braze alloys or cobalt-based braze alloys are usually used with cobalt-based superalloys. Nickel- or cobalt-based compositions generally denote compositions wherein nickel or cobalt is the single greatest element in the composition. The braze alloy composition may also contain silicon, boron, phosphorous or combinations thereof, which serve as melting point suppressants. It is noted that other types of braze alloys can be used, such as precious metal compositions containing silver, gold, or palladium, mixtures thereof, in combination with other metals, such as copper, manganese, nickel, chrome, silicon, and boron. Mixtures that include at least one of the braze alloy elements are also possible. Exemplary braze alloys include by weight percent, 2.9 boron, 92.6 nickel, 4.5 tin; 3.0 boron, 7.0 chromium, 3.0 iron, 83.0 nickel, and 4.0 silicon; 19.0 chromium, 71.0 nickel, and 10.0 silicon; 1.8 boron, 94.7 nickel, and 3.5 silicon.

A variety of materials are generally used as binders in the slurry for forming the green braze tape. Non-limiting examples include water-based organic materials, such as polyethylene oxide and various acrylics. Solvent-based binders can also be used. Additional organic solvent (e.g., acetone, toluene, or various xylenes) or water may be added to the slurry to adjust viscosity.

The slurry is usually tape cast onto a removable support sheet, such as a plastic sheet formed of a material such as Mylar®. A doctor-blade apparatus can be used for tape-casting. Substantially all of the volatile material in the slurry is then allowed to evaporate. The resulting braze alloy tape usually has a thickness in the range of about 1 micron to about 250 microns, and preferably, in the range of about 25 microns to about 125 microns.

Braze tapes containing the above-mentioned braze alloy and binder are commercially available. An example of a commercial product is the Amdry line of braze tapes, available from Sulzer Metco. An exemplary grade is Amdry®100.

The cooling enhancement material that is applied to the green braze tape is typically a coarse powder, being formed of particles having a size sufficient to form protuberances that function to increase heat transfer of the treated component. In many embodiments, the size of the particles is determined in large part by the desired degree of surface roughness and surface area (and consequently, heat transfer) that will be provided by the protuberances. Surface roughness is characterized herein by the centerline average roughness value "Ra," as well as the average peak-to-valley distance "Rz" in a designated area as measured by optical profilometry. According to an embodiment, Ra is greater than about 0.1 mils, such as greater than about 1.0 mils, and preferably greater than about 2.0 mils. Ra is typically less than about 25 mils, more typically less than about 10 mils. Similarly, according to an embodiment, Rz is greater than about 1 mil, such as greater than about 5 mils. Rz is typically less than about 100 mils, more typically less than about 50 mils. As used herein, the term "particles" may include fibers, which have a high aspect ratio, such as greater than 1:1. In one embodiment, the average size of the cooling enhancement powder particles is in the range of about 125 to about 4000 microns, such as about 150 to about 2050 microns. In a preferred embodiment, the average size of the powder particles is in the range of about 180 microns to about 600 microns.

The cooling enhancement material is often formed of a material similar to that of the substrate metal, which is in turn similar to that of the braze alloy. The cooling enhancement powder, however, must have a higher melting point or softening point than that of the braze alloy such that the powder remains largely intact through the fusing operation. Usually, the powder comprises at least one element selected from the group consisting of nickel, cobalt, aluminum, chromium, silicon, iron, and copper. The powder can be formed of a superalloy bond coat composition for thermal barrier coating (TBC) systems, such as a superalloy composition of the formula MCrAlY, where "M" can be various metals or combinations of metals, such as Fe, Ni, or Co. The MCrAlY materials generally have a composition range of about 17.0–23.0% chromium; about 4.5–12.5% aluminum; and about 0.1–1.2% yttrium; with M constituting the balance.

However, it should be emphasized that an important advantage of the present process relates to the ability to change the surface "chemistry" of selected portions of the substrate by changing the composition of the cooling enhancement material. For example, the use of oxidation-resistant or corrosion-resistant metal alloys for such material will result in a turbulated surface that exhibits those desirable properties. As another illustration, the thermal conductivity of the cooling enhancement material, which affects the heat transfer, can be increased by using a material with a high thermal conductivity, such as nickel aluminide which has a thermal conductivity on the order of 450 Btu·in/ft$^2$·hF. In one embodiment, the cooling enhancement powder is formed of a material having a thermal conductivity greater than about 60 Btu·in/ft$^2$·hF, preferably greater than about 80 Btu·in/ft$^2$·hF, such as greater than about 130 Btu·in/ft$^2$·hF. In contrast, prior art casting techniques for producing turbulation usually employ only the base metal material for the protuberances, thereby limiting flexibility in selecting the characteristics of the turbulated surface.

The powder can be randomly applied to the braze sheet by a variety of techniques, such as sprinkling, pouring, blowing, roll-depositing, and the like. The choice of deposition technique will depend in part on the desired arrangement of powder particles, to provide the desired pattern of protuberances. As an example, metered portions of the powder might be sprinkled onto the tape surface through a sieve in those instances where the desired pattern-density of the protuberances is relatively low.

Usually, an adhesive is applied to the surface of the braze tape prior to the application of the cooling enhancement powder thereon. Any braze adhesive can be used, so long as it is capable of completely volatilizing during the subsequent fusing step. Illustrative examples of adhesives include polyethylene oxide and acrylic materials. Commercial examples of braze adhesives include "4B Braze Binder," available from Cotronics Corporation. The adhesive can be applied by various techniques. For example, liquid-like adhesives can be sprayed or coated onto the surface. A thin mat or film with double-sided adhesion could alternatively be used, such as 3M Company's 467 Adhesive Tape.

In one embodiment, prior to being brazed, the powder particles are shifted on the tape surface to provide the desired alignment that would be most suitable for heat transfer. For example, acicular particles, including fibers, having an elongated shape may be physically aligned so that their longest dimension extends substantially perpendicular to the surface of the brazing sheet contacting the substrate. The alignment of the powder may be carried out by various other techniques as well. For example, a magnetic or electrostatic source may be used to achieve the desired orientation. In yet another embodiment, individual particles or clusters of particles are coated with braze alloy, and such coated particles are placed on an adhesive sheet for application to a substrate. The adhesive sheet can be formed of any suitable adhesive, provided that it is substantially completely burned-out during the fusing operation. Suitable adhesives are discussed above.

In some embodiments, the cooling enhancement powder is patterned on the surface of the braze sheet. Various techniques exist for patterning. In one embodiment, the powder is applied to the substrate surface through a screen, by a screen printing technique. The screen would have apertures of a pre-selected size and arrangement, depending on the desired shape and size of the protuberances. Alternatively, the braze adhesive is applied through the screen and onto the sheet. Removal of the screen results in a patterned adhesive layer. When the powder is applied to the sheet, it will adhere to the areas that contain the adhesive. By use of a screen, a pattern may be defined having a plurality of "clusters" of particles, wherein the clusters are generally spaced apart from each other by a pitch corresponding to the spacing of the openings in the screen. The excess powder can easily be removed, leaving the desired pattern of particles. As another alternative, a "cookie cutter" technique may be employed, wherein the braze tape is first cut to define a desired turbulation pattern, followed by removal of the excess braze tape. The powder can then be applied to the patterned tape. In yet another embodiment, particles of the turbulation material are coated with braze alloy, and the coated particles are adhered onto an adhesive sheet that volatilizes during the fusing step. Here, the adhesive sheet provides a simple means for attachment of the cooling enhancement material to the substrate prior to fusing, but generally plays no role in the final, fused article.

In another embodiment, the turbulation powder is mixed with the other components of the green braze tape, such as braze alloy powder, binder and solvent, during formation of the green braze tape, rather than providing the powder on a surface of the already formed tape. The powder in turn forms a dispersed particulate phase within the green braze tape.

To apply the braze tape to the defective area(s), the tape is sized to the defective area. The tape is then attached to the defective surfaces of the casting 10 where turbulation, i.e., enhanced heat transfer, is desired. A simple means of attachment is used in some embodiments. The green braze tape can be placed on the defective surface, and then contacted with a solvent that partially dissolves and plasticizes the binder, causing the tape to conform and adhere to the defective surface, i.e., the tape flows to match the contours of the defective cast bumps or the surface area clear of the bumps. As an example, toluene, acetone or another organic solvent could be sprayed or brushed onto the braze tape after the tape is placed on the defective surface. Where a braze foil system is used, the foil can be spot-welded to the part.

Following application of the braze tape to the defective area, the cooling enhancement material is fused to the substrate. The fusing step can be carried out by various techniques, such as brazing and welding. Generally, fusing is carried out by brazing, which includes any method of joining metals that involves the use of a filler metal or alloy. Thus, it should also be clear that braze tapes and braze foils can be used in fusing processes other than "brazing." Brazing temperatures depend in part on the type of braze alloy used, and are typically in the range of about 525° C. to about 1650° C. In the case of nickel-based braze alloys, braze temperatures are usually in the range of about 800° C. to about 1260° C.

When possible, brazing is often carried out in a vacuum furnace. The amount of vacuum will depend in part on the composition of the braze alloy. Usually, the vacuum will be in the range of about $10^{-1}$ torr to about $10^{-8}$ torr, achieved by evacuating ambient air from a vacuum chamber to the desired level. In the case of cooling enhancement material being applied to an area which does not lend itself to the use of a furnace, a torch or other localized heating means can be used. For example, a torch with an inert atmosphere cover gas shield or flux could be directed at the brazing surface. Specific, illustrative types of heating techniques for this purpose include the use of gas welding torches (e.g., oxy-acetylene, oxy-hydrogen, air-acetylene, air-hydrogen); RF (radio frequency) welding; TIG (tungsten inert-gas) welding; electron-beam welding; resistance welding; and the use of IR (infrared) lamps.

The fusing step fuses the brazing sheet to the defective surface area. When the braze material cools, it forms a metallurgical bond at the surface, with the turbulation material mechanically retained within the solidified braze matrix material.

In the embodiments described above, the structure of the component after-fusing includes a solidified braze film that forms a portion of the outer surface of the component, and protuberances that extend beyond that surface. The protuberances are generally made up of a particulate phase comprised of discrete particles. The particles may be arranged in a monolayer, which generally has little or no stacking of particles, or alternatively, clusters of particles in which some particles may be stacked on each other. Thus, after fusing, the treated component has an outer surface defined by the film of braze alloy, which has a particulate phase embedded therein. The film of braze alloy may form a continuous matrix phase. As used herein, "continuous" matrix phase denotes an uninterrupted film along the treated region of the substrate, between particles or clusters of particles. Alternatively, the film of braze alloy may not be continuous, but rather, be only locally present to bond individual particles to the substrate. In this case, the film of braze alloy is present in the form of localized fillets, surrounding discrete particles or clusters of particles. In either case, thin portions of the film may extend so as to coat or partially coat particles of the powder.

Figure 3:
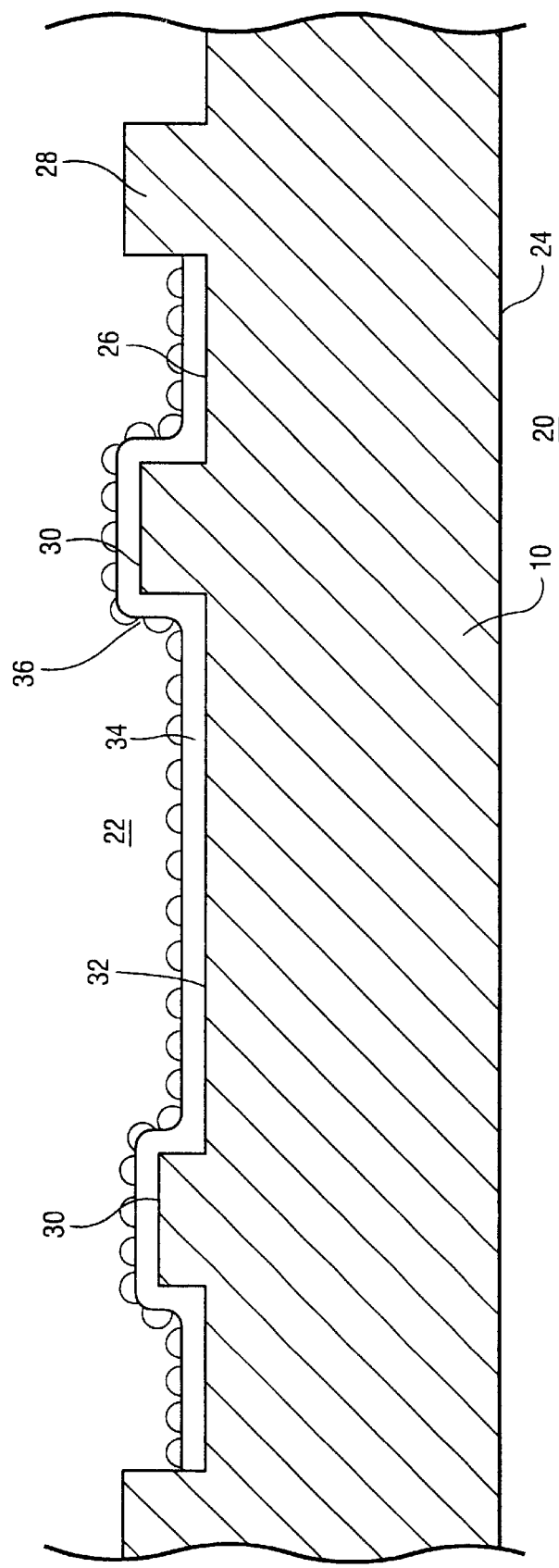
FIG. 3 is a view similar to FIG. 1 illustrating the defective area coated with a cooling enhancement material.

As an illustrative example of the use of a rough coating of the foregoing-described type in areas of defectively cast bumps to enhance heat transfer, and referring to FIG. 3, there is illustrated an element 10 forming a cast part of the gas turbine. The element 10 comprises a wall, such as a nozzle or shroud wall, separating a high temperature region 20 and a cooling region 22 from one another. Thus, element 10 has a hot side 20 having a hot side surface 24 and a cooling region 22, e.g., a coolant side surface 26. Cast-in bumps 28, generally in the nature of cylindrical projections 28, are illustrated on the coolant side surface 26 and provide a surface area larger than the surface area of the coolant side surface 26 without the bumps 28 to afford increased heat transfer values. Additionally, as illustrated in FIG. 3, defective surface areas include partially formed bumps 30 and/or areas 32 where bumps 28, though intended, were not cast. It will be appreciated that such defective areas do not obtain the benefits of enhanced heat transfer resulting from properly cast-in bumps 30.

In accordance with a preferred embodiment of the present invention, a surface coating 34 is applied only on the defective areas, i.e., areas 30 and 32. The coating may be of the type as previously described, e.g., comprises a braze alloy and a roughness producing cooling enhancement material. The material 34 in the coating preferably comprises metallic particles 36 bonded to the defective surface areas. With the material and the coating, the surface area ratio, i.e., the surface area with the coating and cooling enhancement material divided by the defective surface area without the material and coating is in excess of the first surface area ratio and affords enhanced heat transfer values. Thus, the local heat transfer enhancement value of the surface coated with the coating and protuberances fused to the surface is greater than the heat transfer value of the defective surface area(s) without the coating. It will be appreciated that the coating may be applied in accordance with any of the techniques described previously to form a brazed alloy coating that forms a continuous matrix phase and a discrete particulate phase comprised of cooling enhancement. The articles may be randomly arranged or arranged in a predetermined pattern, as discussed.

From the foregoing description, it will be appreciated that the surface areas of parts which have defectively cast-in bumps may be effectively repaired to produce enhanced heat transfer characteristics. The cast parts, which previously contained defective bumps, need not, with the advent of the present invention, be scrapped. Rather, the parts can be salvaged and used without the resulting economic loss.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of salvaging a casting having cast cooling bumps projecting from a surface thereof wherein at least one area of said surface has defectively cast bumps manifested by one or more missing or partially cast bumps, comprising the steps of:

identifying the defectively cast area; and applying a coating on said defectively cast area to form an overlying coated surface forming a coated surface area in excess of the uncoated defective surface area to afford enhanced heat transfer across the casting relative to the heat transfer across the casting without applying the coating.

2. A method according to claim 1 including applying the coating solely to the defectively cast area.

3. A method according to claim 1 wherein the coating comprises a braze alloy and cooling enhancement material, and including the further step of fusing the braze alloy onto the defectively cast area to bond the cooling enhancement material thereto.

4. A method according to claim 1 wherein said. coating includes a brazing sheet having a braze alloy and a binder, said coating further including cooling enhancement material having metal particles.

5. A method according to claim 1 wherein said coating includes a braze sheet having a braze alloy without a binder.

6. A method of salvaging a casting having cast cooling bumps projecting from a surface thereof wherein at least one area of said surface has defectively cast bumps manifested by one or more missing or partially cast bumps, comprising the steps of:

identifying the defectively cast area;

providing a brazing sheet having cooling enhancement material; and fusing the brazing sheet to said defectively cast area such that said cooling enhancement material is bonded thereto.

7. A method according to claim 6 including fusing the brazing sheet to said defectively cast area such that the cooling enhancement material forms protuberances projecting therefrom.

8. A method according to claim 6 wherein said brazing sheet comprises a braze tape having first and second surfaces on opposite sides thereof, said cooling enhancement material being applied to said second surface of said tape and fusing the tape to said defectively cast area with said first surface of said tape being applied thereto.

9. A method according to claim 6 including applying the brazing sheet solely to the defectively cast area.

10. A cast body having a cooling surface and an opposite surface for exposure to a high-temperature fluid medium;

said cooling surface having a plurality of cast cooling bumps projecting therefrom and at least one area thereof having defectively cast bumps manifested by one or more missing or partially cast bumps;

a coating overlying said defectively cast area forming a coated surface having an area in excess of the defectively cast area to afford enhanced heat transfer across the casting relative to the heat transfer across the coating without the coating.

11. A cast body according to claim 10 wherein said coating overlies substantially solely the defectively cast area.

12. A cast body according to claim 10 wherein said coating includes a braze alloy and particulate cooling enhancement material.

13. A cast body according to claim 10 wherein said coating includes a brazing sheet having a braze alloy and a binder, said coating further including cooling enhancement material having metal particles.

* * * * *